(12) United States Patent
Tan

(10) Patent No.: US 10,876,502 B1
(45) Date of Patent: Dec. 29, 2020

(54) AIR COOLING CHAMBER ASSEMBLY AND INTERNAL COMBUSTION ENGINE HAVING THE SAME

(71) Applicant: EcoDrive Inc., Johns Creek, GA (US)

(72) Inventor: Hwee Teng Tan, Johns Creek, GA (US)

(73) Assignee: EcoDrive, Inc., Johns Creek, GA (US)

( * ) Notice: Subject to any disclaimer, the term of this patent is extended or adjusted under 35 U.S.C. 154(b) by 0 days.

(21) Appl. No.: 16/816,119

(22) Filed: Mar. 11, 2020

(51) Int. Cl.
*F02M 31/20* (2006.01)
*F01P 9/06* (2006.01)
*F02B 29/04* (2006.01)

(52) U.S. Cl.
CPC .......... *F02M 31/20* (2013.01); *F02B 29/0443* (2013.01); *F01P 2025/13* (2013.01); *F01P 2060/02* (2013.01); *F02B 29/0475* (2013.01); *F02B 29/0493* (2013.01)

(58) Field of Classification Search
CPC ........ F01P 9/06; F01P 2060/14; F02M 26/24; F02M 26/32; F02M 31/20
See application file for complete search history.

(56) References Cited

U.S. PATENT DOCUMENTS

| | | | | |
|---|---|---|---|---|
| 5,651,268 A | * | 7/1997 | Aikawa | F25B 39/028 138/44 |
| 6,394,076 B1 | * | 5/2002 | Hudelson | F28F 1/32 123/540 |
| 9,261,056 B2 | * | 2/2016 | Burke | F02B 29/0443 |
| 2008/0087402 A1 | * | 4/2008 | Burk | F02M 35/10222 165/101 |
| 2016/0114646 A1 | * | 4/2016 | Danjyo | F28D 20/02 62/434 |
| 2017/0022885 A1 | * | 1/2017 | Lee | F02M 35/10268 |

\* cited by examiner

*Primary Examiner* — Long T Tran
(74) *Attorney, Agent, or Firm* — Ming Jiang; MM IP Services LLC

(57) ABSTRACT

Present disclosure relates to air cooling chamber assembly. The air cooling chamber assembly includes: an air intake duct receiving ambient air outside of an internal combustion engine, an air cooling chamber cooling the ambient air received from the air intake duct to generate cooled air, and an air output duct providing the cooled air generated from the air cooling chamber to the internal combustion engine. The air cooling chamber assembly is connected to an air intake of the internal combustion engine to cool the ambient air to generate the cooled air prior to entering the internal combustion engine, and to provide the cooled air generated to the air intake of the internal combustion engine. The cooled air from air cooling chamber contains increased amount of oxygen molecules, and increased amount of oxygen molecules in the cooled air improves fuel efficiency and reduces greenhouse gas emission of the internal combustion engine.

20 Claims, 3 Drawing Sheets

AIR COOLING CHAMBER ASSEMBLY AND INTERNAL COMBUSTION ENGINE HAVING THE SAME

FIELD

The present disclosure generally relates to the field of internal combustion engine, and more particularly to air cooling chamber assemblies to increase intake ambient air density and oxygen molecules to improve fuel efficiency of the internal combustion engines, and the internal combustion engines having the air cooling chamber assemblies.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engine uses energy by burning the mixture of fuel and air to produce power. In order to improve fuel consumption rate of the internal combustion engine, many engines employ turbocharger, in which the power of the exhaust gas turns the turbine that is mechanically connected to an air-blower for supplying and compressing the filtered intake ambient air into the engine. The objective of a turbocharger is to improve an engine's efficiency by increasing the density of the intake air by compressing the intake air before the intake air enters the intake manifold of the internal combustion engine. This results in a greater mass of air entering the cylinders on each intake stroke thereby allowing more power per engine cycle. However, temperature of the pressurized air or charge air can rise as high as 150° C., as a result, the density of the charge air will be reduced. This affects the performance of the original intention to improve the fuel efficiency.

Therefore, an unaddressed need exists in the art to address the aforementioned deficiencies and inadequacies.

SUMMARY

In one aspect, the present disclosure relates to an air cooling chamber assembly. In certain embodiments, the air cooling chamber assembly includes: an air intake duct, an air cooling chamber, and an air output duct. The air intake duct receives ambient air outside of an internal combustion engine. The air cooling chamber cools the ambient air received from the air intake duct to generate cooled air. The air output duct provides the cooled air generated from the air cooling chamber to the internal combustion engine.

In certain embodiments, the air cooling chamber assembly is connected to an air intake of the internal combustion engine to cool the ambient air to generate the cooled air prior to entering the internal combustion engine, and to provide the cooled air generated to the air intake of the internal combustion engine.

In certain embodiments, the air intake duct includes: a first end, and an opposite, second end. The first end receives the ambient air. The second end provides the ambient air to the air cooling chamber.

In certain embodiments, the air output duct includes: a first end, and an opposite, second end. The first end receives the cooled air from the air cooling chamber. The second end provides the cooled air received to the air intake of the internal combustion engine.

In certain embodiments, the air output duct is shielded by one or more thermal shield materials to maintain low temperature of the cooled air in an engine compartment of the internal combustion engine.

In certain embodiments, the air cooling chamber includes an evaporator. The evaporator includes: an array of fins and a gaseous refrigerant tube. The gaseous refrigerant tube has a first end and a second end. The first end of the gaseous refrigerant tube is connected to a low pressure line of a cooling device to receive a gaseous refrigerant. The second end of the gaseous refrigerant tube is connected to an input of a compressor of the cooling device. The evaporator cools the ambient air passing through the air cooling chamber to generate the cooled air.

In certain embodiments, air density of the cooled air from the air cooling chamber is increased due to a cooling process inside the air cooling chamber assembly. High density cooled air from the air cooling chamber includes increased amount of oxygen molecules, and the increased amount of oxygen molecules in the high density cooled air improves the fuel efficiency and reduces greenhouse gas emission of the internal combustion engine.

In another aspect, the present disclosure relates to an internal combustion engine. In certain embodiments, the internal combustion engine includes an air cooling chamber assembly. The air cooling chamber assembly includes: an air intake duct, an air cooling chamber, and an air output duct. The air intake duct receives ambient air outside of the internal combustion engine. The air cooling chamber cools the ambient air received from the air intake duct to generate cooled air. The air output duct provides the cooled air generated from the air cooling chamber to the internal combustion engine.

In certain embodiments, the air cooling chamber assembly is connected to an air intake of the internal combustion engine to cool the ambient air to generate the cooled air prior to entering the internal combustion engine, and to provide the cooled air generated to the air intake of the internal combustion engine.

In certain embodiments, the air intake duct includes: a first end, and an opposite, second end. The first end receives the ambient air. The second end provides the ambient air to the air cooling chamber.

In certain embodiments, the air output duct includes: a first end, and an opposite, second end. The first end receives the cooled air from the air cooling chamber. The second end provides the cooled air received to the air intake of the internal combustion engine.

In certain embodiments, the air output duct is shielded by one or more thermal shield materials to maintain low temperature of the cooled air in an engine compartment of the internal combustion engine.

In certain embodiments, the air cooling chamber includes an evaporator. The evaporator includes: an array of fins and a gaseous refrigerant tube. The gaseous refrigerant tube has a first end and a second end. The first end of the gaseous refrigerant tube is connected to a low pressure line of a cooling device to receive a gaseous refrigerant. The second end of the gaseous refrigerant tube is connected to an input of a compressor of the cooling device. The evaporator cools the ambient air passing through the air cooling chamber to generate the cooled air.

In certain embodiments, air density of the cooled air from the air cooling chamber is increased due to a cooling process inside the air cooling chamber assembly. High density cooled air from the air cooling chamber includes increased amount of oxygen molecules, and the increased amount of oxygen molecules in the high density cooled air improves the fuel efficiency and reduces greenhouse gas emission of the internal combustion engine.

In yet another aspect, the present disclosure relates to an internal combustion engine. In certain embodiments, the internal combustion engine includes an air cooling chamber assembly. The air cooling chamber assembly is powered by a standalone cooling device and the air cooling chamber assembly includes an air intake duct, an air cooling chamber, and an air output duct. The air intake duct receives ambient air from outside of the internal combustion engine. The air cooling chamber cools the ambient air received from the air intake duct to generate cooled air. The air output duct provides the cooled air from the air cooling chamber to an air intake of the internal combustion engine.

In certain embodiments, the air intake duct includes: a first end, and an opposite, second end. The first end of the air intake duct receives the ambient air. The second end of the air intake duct provides the ambient air to the air cooling chamber.

In certain embodiments, the air output duct includes: a first end, and an opposite, second end. The first end of the air output duct receives the cooled air from the air cooling chamber. The second end of the air output duct provides the cooled air received to the air intake of the internal combustion engine.

In certain embodiments, the air output duct is shielded by one or more thermal shield materials to maintain low temperature of the cooled air in an engine compartment of the internal combustion engine.

In certain embodiments, the air cooling chamber includes an evaporator and the evaporator includes an array of fins and a gaseous refrigerant tube. The gaseous refrigerant tube has a first end and a second end. The first end of the gaseous refrigerant tube is connected to a first end of an expansion valve and a second end of the expansion valve is connected to a high pressure line of the standalone cooling device to receive a gaseous refrigerant. The second end of the gaseous refrigerant tube is connected to a low pressure line and further connected to an input of a compressor of the standalone cooling device. The evaporator of the air cooling chamber cools the ambient air passing through the air cooling chamber to generate the cooled air.

In certain embodiments, the standalone cooling device includes: a control unit, the compressor, a condenser, and a receiver dryer. The control unit is powered by a first power connector and a second power connector of a battery. The control unit controls the operation of the standalone cooling device. The standalone cooling device is turned on when the control unit detects from an ignition circuit of the internal combustion engine that an ignition of the internal combustion engine is on.

In certain embodiments, the compressor compresses gaseous refrigerant of the standalone cooling device. The compressor has a low pressure line connector and a high pressure line connector. The low pressure line connector connects to the low pressure line. The high pressure line connector connects to the high pressure line. The compressor has a first power line and a second power line. The first power line of the compressor is connected to a first power output line of the control unit, and the second power line of the compressor is connected to a second power output line of the control unit 402 to drive the compressor, respectively.

In certain embodiments, the condenser includes an array of fins and a gaseous refrigerant tube. The array of fins and the gaseous refrigerant tube are used for cooling liquefy refrigerant using a DC fan after each compression cycle. The DC fan is powered and controlled by a third power output line and a fourth power output line of the control unit.

In certain embodiments, the receiver dryer stores the liquefy refrigerant from the condenser and delivers the liquefy refrigerant to the expansion valve for lowering the pressure of the liquefy refrigerant to allow it to change from a liquid to gaseous. The first end of the expansion valve is connected to the first end of the gaseous refrigerant tube, and the second end of the expansion valve is connected to the high pressure line.

In certain embodiments, air density of the cooled air from the air cooling chamber is increased due to a cooling process inside the air cooling chamber assembly. High density cooled air from the air cooling chamber includes increased amount of oxygen molecules, and the increased amount of oxygen molecules in the high density cooled air improves the efficiency of the internal combustion engine.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment. The drawings do not limit the present disclosure to the specific embodiments disclosed and described herein. The drawings are not necessarily to scale, emphasis instead being placed upon clearly illustrating the principles of the disclosure, and wherein.

DETAILED DESCRIPTION

Figure 1:
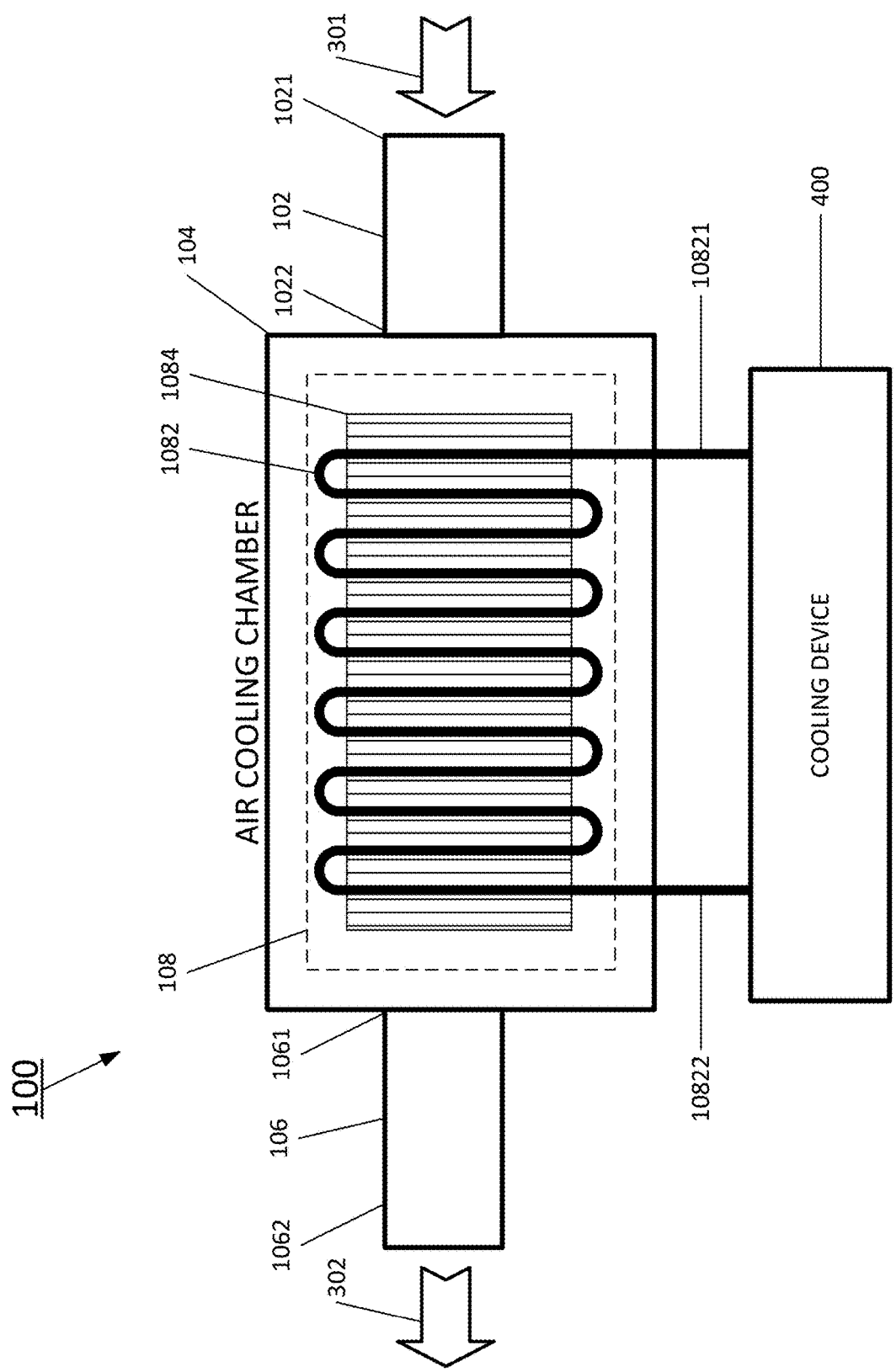
FIG. 1 illustrates an air cooling chamber assembly according to certain embodiments of the present disclosure.

The present disclosure will now be described more fully hereinafter with reference to the accompanying drawings, in which exemplary embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

Many specific details are provided in the following descriptions to make the present disclosure be fully understood, but the present disclosure may also be implemented by using other manners different from those described herein, so that the present disclosure is not limited by the specific embodiments disclosed in the following.

The description will be made as to the embodiments of the present disclosure in conjunction with the accompanying drawings FIGS. 1 through 3.

In one aspect, the present disclosure relates to an air cooling chamber assembly 100. In certain embodiments, as shown in FIG. 1, the air cooling chamber assembly 100 is an add-on to an internal combustion engine to reduce temperature of incoming ambient air, increase oxygen molecules in cooled air, and improve fuel efficiency of the internal combustion engine. The air cooling chamber assembly 100 includes: an air intake duct 102, an air cooling chamber 104, and an air output duct 106. The air intake duct 102 receives ambient air 301 outside of an internal combustion engine 200. The air cooling chamber 104 cools the ambient air 301 received from the air intake duct 102 to generate cooled air 302. The air output duct 106 provides the cooled air 302 generated from the air cooling chamber 104 to the internal combustion engine 200.

In certain embodiments, the air cooling chamber 104 includes an evaporator 108. The evaporator 108 includes: an array of fins 1084 and a gaseous refrigerant tube 1082. The gaseous refrigerant tube 1082 has a first end 10821 and a second end 10822. The first end 10821 of the gaseous refrigerant tube 1082 is connected to a low pressure line of a cooling device 400 to receive a gaseous refrigerant. The second end 10822 of the gaseous refrigerant tube 1082 is connected to an input of a compressor of the cooling device 400. The evaporator 108 cools the ambient air 301 passing through the air cooling chamber 104 to generate the cooled air 302. In certain embodiments, the cooling device 400 includes a separate compressor based cooling system.

Figure 2:
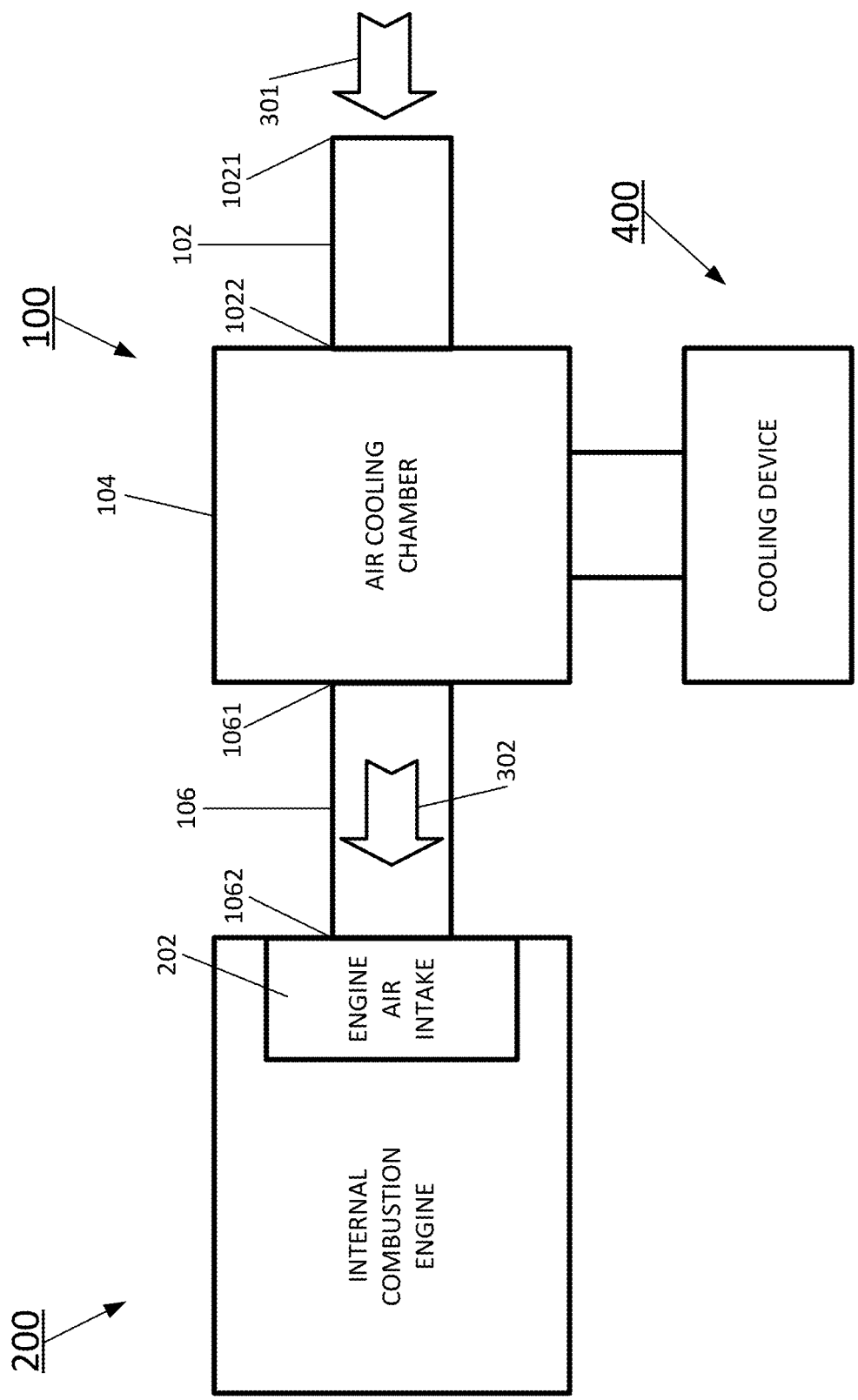
FIG. 2 illustrates an air cooling chamber assembly for an internal combustion engine according to certain embodiments of the present disclosure.

Referring now to FIG. 2, in certain embodiments, the air intake duct 102 includes: a first end 1021, and an opposite, second end 1022. The first end 1021 receives the ambient air 301. The second end 1022 provides the ambient air 301 to the air cooling chamber 104.

In certain embodiments, the air output duct 106 includes: a first end 1061, and an opposite, second end 1062. The first end 1061 receives the cooled air 302 from the air cooling chamber 104. The second end 1062 provides the cooled air 302 received to an engine air intake 202 of the internal combustion engine 200.

In certain embodiments, the air cooling chamber assembly 100 is connected to the engine air intake 202 of the internal combustion engine 200 to cool the ambient air 301 to generate the cooled air 302 prior to entering the internal combustion engine 200, and to provide the cooled air 302 generated to the engine air intake 202 of the internal combustion engine 200.

In certain embodiments, the air output duct 106 is shielded by one or more thermal shield materials to shield the heat from the internal combustion engine 200 and maintain low temperature of the cooled air 302 in an engine compartment of the internal combustion engine 200. In certain embodiments, the thermal shield materials include thermal sleeving, thermal barriers, and/or thermal wraps. In other embodiments, the thermal shield materials include solid steel heat shield, aluminum heat shield, and/or ceramic thermal barrier coated heat insulation materials. These thermal shield materials are very important, and the air cooling chamber assembly 100 may not work as effectively as designed without these thermal shield materials.

In certain embodiments, air density of the cooled air 302 from the air cooling chamber 104 is increased due to a cooling process inside the air cooling chamber assembly 100. High density cooled air 302 from the air cooling chamber 104 contains increased amount of oxygen molecules, and these increased amount of oxygen molecules in the high density cooled air 302 improves the fuel efficiency of the internal combustion engine 200.

In another aspect, the present disclosure relates to an internal combustion engine 200. In certain embodiments, as shown in FIG. 2, the internal combustion engine 200 includes an air cooling chamber assembly 100. The air cooling chamber assembly 100 includes: an air intake duct 102, an air cooling chamber 104, and an air output duct 106. The air intake duct 102 has a first end 1021 and a second end 1022, and the air intake duct 102 receives ambient air 301 at the first end 1021 outside of the internal combustion engine 200. The air cooling chamber 104 receives the ambient air 301 from the second end 1022 of the air intake duct 102, and cools the ambient air 301 received from the air intake duct 102 to generate cooled air 302. The air output duct 106 has a first end 1061 and a second end 1062, and the first end 1061 of the air output duct 106 receives the cooled air 302 from the air cooling chamber 104 and provides the cooled air 302 generated from the air cooling chamber 104 to the internal combustion engine 200 at the second end 1062 of the air output duct 106.

In certain embodiments, the air cooling chamber assembly 100 is connected to an engine air intake 202 of the internal combustion engine 200 to cool the ambient air 301 to generate the cooled air 302 prior to entering the internal combustion engine 200, and to provide the cooled air 302 generated to the engine air intake 202 of the internal combustion engine 200.

In certain embodiments, the air output duct 106 is shielded by one or more thermal shield materials to shield the heat from the internal combustion engine 200 and maintain low temperature of the cooled air 302 in an engine compartment of the internal combustion engine 200. In certain embodiments, the thermal shield materials include thermal sleeving, thermal barriers, and/or thermal wraps. In other embodiments, the thermal shield materials include solid steel heat shield, aluminum heat shield, and/or ceramic thermal barrier coated heat insulation materials. These thermal shield materials are very important, and the air cooling chamber assembly 100 may not work as effectively as designed without these thermal shield materials.

In certain embodiments, the air cooling chamber 104, as shown in FIG. 1, includes an evaporator 108. The evaporator 108 includes: an array of fins 1084 and a gaseous refrigerant tube 1082. The gaseous refrigerant tube 1082 has a first end 10821 and a second end 10822. The first end 10821 of the gaseous refrigerant tube 1082 is connected to a low pressure line of a cooling device 400 to receive a gaseous refrigerant. The second end 10822 of the gaseous refrigerant tube 1082 is connected to an input of a compressor of the cooling device 400. The evaporator 108 cools the ambient air 301 passing through the air cooling chamber 104 to generate the cooled air 302.

In one embodiment, the cooling device 400 is a separate compressor based cooling system. The compressor based cooling system includes a compressor for compressing the gaseous refrigerant resides in the system into a high temperature, high pressure gaseous refrigerant. The high temperature, high pressure gaseous refrigerant passes through a compressor's outlet and travels through a high-pressure lines to a condenser. The condenser is similar to a small radiator, and through a heat exchanging process with atmospheric air, the high temperature, high pressure gaseous refrigerant is liquefied. The liquefy refrigerant then flows into an expansion valve where it is restricted and becomes low temperature gaseous refrigerant. The low temperature gaseous refrigerant is now able to absorb heat from the air passing through an evaporator fins, leaving behind the cooler air 302. A cooled air fan may be used to blow the cool air 302 into the internal combustion engine's engine air intake 202 through the second end 1062 of the air output duct 106.

In certain embodiments, air density of the cooled air 302 from the air cooling chamber 104 is increased due to a cooling process inside the air cooling chamber assembly 100. High density cooled air 302 from the air cooling chamber 104 contains increased amount of oxygen molecules, and the increased amount of oxygen molecules in the high density cooled air 302 improves the fuel efficiency and reduces greenhouse gas emission of the internal combustion engine 200.

In yet another aspect, the present disclosure relates to an internal combustion engine 200. In certain embodiments, as shown in FIG. 3, the internal combustion engine 200 includes an air cooling chamber assembly 100. The air cooling chamber assembly 100 is powered by a standalone cooling device 400. The air cooling chamber assembly 100, as shown in FIG. 1 and FIG. 2, includes an air intake duct 102, an air cooling chamber 104, and an air output duct 106. The air intake duct 102 receives ambient air 301 from outside of the internal combustion engine 200. The air cooling chamber 104 cools the ambient air 301 received from the air intake duct 102 to generate cooled air 302. The air output duct 106 provides the cooled air 302 from the air cooling chamber 104 to an engine air intake 202 of the internal combustion engine 200.

In certain embodiments, the air cooling chamber assembly 100 is connected to an engine air intake 202 of the internal combustion engine 200 to cool the ambient air 301 to generate the cooled air 302 prior to entering the internal combustion engine 200, and to provide the cooled air 302 generated to the engine air intake 202 of the internal combustion engine 200.

In certain embodiments, the air intake duct 102 includes: a first end 1021, and an opposite, second end 1022. The first end 1021 of the air intake duct 102 receives the ambient air 301. The second end 1022 of the air intake duct 102 provides the ambient air 301 to the air cooling chamber 104.

In certain embodiments, the air output duct 106 includes: a first end 1061, and an opposite, second end 1062. The first end 1061 of the air output duct 106 receives the cooled air 302 from the air cooling chamber 104. The second end 1062 of the air output duct 106 provides the cooled air 302 received to the engine air intake 202 of the internal combustion engine 200.

Figure 3:
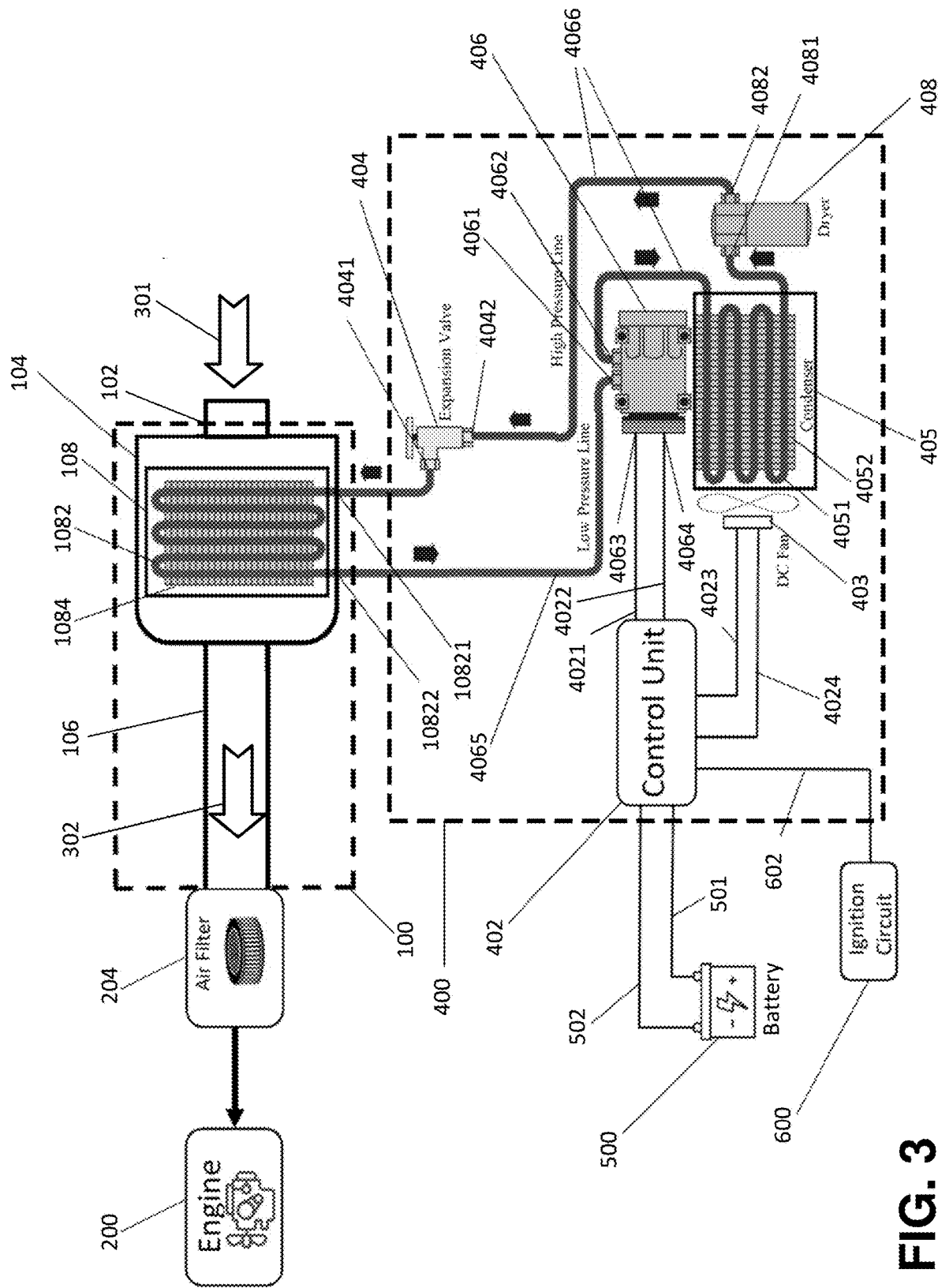
FIG. 3 illustrates an air cooling chamber assembly for an internal combustion engine having a standalone cooling device according to certain embodiments of the present disclosure.

In certain embodiments, the air cooling chamber 104, as shown in FIG. 3, includes an evaporator 108. The evaporator 108 includes an array of fins 1084 and a gaseous refrigerant tube 1082. The gaseous refrigerant tube 1082 has a first end 10821 and a second end 10822. The first end 10821 of the gaseous refrigerant tube 1082 is connected to a first end 4041 of an expansion valve 404 and a second end 4042 of the expansion valve 404 is connected to a high pressure line 4066 of the standalone cooling device 400 to receive a gaseous refrigerant. The second end 10822 of the gaseous refrigerant tube 1082 is connected to a low pressure line 4065 and further connected to an input 4061 of a compressor 406 of the standalone cooling device 400. The evaporator 108 of the air cooling chamber 104 cools the ambient air 301 passing through the air cooling chamber 104 to generate the cooled air 302.

In certain embodiments, the standalone cooling device 400 includes: a control unit 402, the compressor 406, a condenser 405, and a receiver dryer 408. The control unit 402 is powered by a first power connector 501 and a second power connector 502 of a battery 500. The control unit 402 controls the operation of the standalone cooling device 400. The standalone cooling device 400 is turned on when the control unit 402 detects from an ignition circuit 600 of the internal combustion engine 200 that an ignition of the internal combustion engine 200 is on.

In certain embodiments, the compressor 406 compresses the gaseous refrigerant resides in the standalone cooling device 400 into a high temperature and high pressure gaseous refrigerant. The compressor 406 has a low pressure line connector 4061 and a high pressure line connector 4062. The low pressure line connector 4061 connects to the low pressure line 4065. The high pressure line connector 4062 connects to the high pressure line 4066. The compressor 406 has a first power line 4063 and a second power line 4064. The first power line 4063 of the compressor 406 is connected to a first power output line 4021 of the control unit 402, and the second power line 4064 of the compressor 406 is connected to a second power output line 4022 of the control unit 402 to drive the compressor 406, respectively.

In certain embodiments, the condenser 405 includes an array of fins 4052 and a gaseous refrigerant tube 4051. The array of fins 4052 and the gaseous refrigerant tube 4051 are used for cooling liquefy refrigerant using a DC fan 403 after each compression cycle. The DC fan 403 is powered and controlled by a third power output line 4023 and a fourth power output line 4024 of the control unit 402.

In certain embodiments, the receiver dryer 408 stores the liquefy refrigerant from the condenser 405 and delivers the liquefy refrigerant to the expansion valve 404 for lowering the pressure of the liquefy refrigerant to allow it to change from a liquid to gaseous. The first end 4041 of the expansion valve 404 is connected to the first end 10821 of the gaseous refrigerant tube 1082, and the second end 4042 of the expansion valve 404 is connected to the high pressure line 4066.

In certain embodiments, air density of the cooled air 302 from the air cooling chamber 104 is increased due to a cooling process inside the air cooling chamber assembly 100. High density cooled air 302 from the air cooling chamber 104 includes increased amount of oxygen molecules, and the increased amount of oxygen molecules in the high density cooled air 302 improves the efficiency of the internal combustion engine 200 having the standalone cooling device 400.

In certain embodiments, the high temperature and high pressure gaseous refrigerant passes into an input connector 4061 out of an output connector 4062 and travels through a high-pressure lines 4066 to the condenser 405. The condenser 405 is similar to a small radiator, and the high temperature and high pressure gaseous refrigerant is liquefied through a heat exchanging process with atmospheric air. The liquefy refrigerant then flows through a receiver dryer 408 and a high pressure line connector 4082 into a high pressure line 4066 to the expansion valve 404. The liquefy refrigerant is restricted and becomes low temperature gaseous refrigerant. The low temperature gaseous refrigerant then travels through the tubing into the evaporator 108. The low temperature gaseous refrigerant flows through the finned-tube 1084 and returns to a low pressure inlet 4061 of the compressor 406 via the second end 10822 of the gaseous refrigerant tube 1082 of the evaporator 108.

The gaseous refrigerant flowing back to the compressor 406 will be compressed back into the high-pressure and high temperature gaseous refrigerant and the cooling process repeats. While cold gaseous refrigerant passes through the finned-tube 1082 of the evaporator 108, and through a heat exchange process, it lowers the temperature of the intake ambient air 301 that sucked in through the first end 1021 of the air intake duct 102, passes the finned-tube 1084.

The cooled air 302 becomes high density air, and the high density air carries increased amount of oxygen molecules. The high density cooled air 302 is then directed to an air-filter unit 204 through the air output duct 106 before providing this high density cooled air 302 to the internal combustion engine 200.

In certain embodiments, the air output duct 106 connecting the air cooling chamber assembly 100 to the air filter 204 is shielded by one or more thermal shield materials to shield the heat from the internal combustion engine 200 and maintain low temperature of the cooled air 302 in an engine compartment of the internal combustion engine 200. In certain embodiments, the thermal shield materials include thermal sleeving, thermal barriers, and/or thermal wraps. In other embodiments, the thermal shield materials include solid steel heat shield, aluminum heat shield, and/or ceramic thermal barrier coated heat insulation materials. These thermal shield materials are very important, and the air cooling chamber assembly 100 may not work properly without these thermal shield materials.

In certain embodiments, air density of the cooled air 302 from the air cooling chamber 104 is increased due to a cooling process inside the air cooling chamber assembly 100. High density cooled air 302 from the air cooling chamber 104 contains increased amount of oxygen molecules, and the increased amount of oxygen molecules in the high density cooled air 302 improves the fuel efficiency and reduces greenhouse gas emission of the internal combustion engine 200 of the automobile.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An air cooling chamber assembly, comprising:
an air intake duct for receiving ambient air outside of an internal combustion engine;
an air cooling chamber for cooling the ambient air received from the air intake duct to generate cooled air, wherein the air cooling chamber is powered by a standalone cooling device, and the standalone cooling device comprises: a control unit, a compressor, a condenser, and a receiver dryer; and
an air output duct for providing the cooled air generated from the air cooling chamber to the internal combustion engine,
wherein, the air cooling chamber assembly is connected to an air intake of the internal combustion engine to cool the ambient air to generate the cooled air prior to entering the internal combustion engine, and to provide the cooled air generated to the air intake of the internal combustion engine.

2. The air cooling chamber assembly of claim 1, wherein the standalone cooling device comprises:
the control unit powered by a first power connector and a second power connector of a battery, wherein the control unit controls the operation of the standalone cooling device, and the control unit turns on the standalone cooling device when the control unit detects from an ignition circuit of the internal combustion engine that an ignition of the internal combustion engine is on;
the compressor for compressing gaseous refrigerant of the standalone cooling device, wherein the compressor comprises a low pressure line connector connecting a low pressure line, a high pressure line connector connecting a high pressure line, a first power line connecting to a first power output line of the control unit, and a second power line connecting to a second power output line of the control unit;
the condenser, wherein the condenser comprises an array of fins and a gaseous refrigerant tube for cooling liquefy refrigerant using a DC fan after each compression cycle, wherein the DC fan is powered and controlled by a third power output line and a fourth power output line of the control unit, and
the receiver dryer, wherein the receiver dryer stores the liquefy refrigerant from the condenser and delivers the liquefy refrigerant to an expansion valve for lowering the pressure of the liquefy refrigerant to allow it to change from a liquid to gaseous,
wherein the first end of the expansion valve is connected to the first end of the gaseous refrigerant tube, and the second end of the expansion valve is connected to the high pressure line.

3. The air cooling chamber assembly of claim 2, wherein the air intake duct comprises:
a first end, wherein the first end receives the ambient air, and
an opposite, second end, wherein the second end provides the ambient air to the air cooling chamber, and
the air output duct comprises:
a first end, wherein the first end receives the cooled air from the air cooling chamber, and
an opposite, second end, wherein the second end provides the cooled air received to the air intake of the internal combustion engine.

4. The air cooling chamber assembly of claim 3, wherein the air output duct is shielded by one or more thermal shield materials to maintain low temperature of the cooled air in an engine compartment of the internal combustion engine.

5. The air cooling chamber assembly of claim 4, wherein the air cooling chamber comprises an evaporator, wherein the evaporator comprises:
an array of fins and a gaseous refrigerant tube having a first end and a second end,
wherein the first end of the gaseous refrigerant tube is connected to a low pressure line of a cooling device to receive a gaseous refrigerant, and the second end of the gaseous refrigerant tube is connected to an input of a compressor of the cooling device, and the evaporator cools the ambient air passing through the air cooling chamber to generate the cooled air.

6. The air cooling chamber assembly of claim 1, wherein air density of the cooled air from the air cooling chamber is increased due to a cooling process inside the air cooling chamber assembly.

7. The air cooling chamber assembly of claim 1, wherein high density cooled air from the air cooling chamber comprises increased amount of oxygen molecules, and the increased amount of oxygen molecules in the high density cooled air improves the fuel efficiency and reduces greenhouse gas emission of the internal combustion engine.

8. An internal combustion engine, comprising:
an air cooling chamber assembly, wherein the air cooling chamber assembly comprises:
an air intake duct for receiving ambient air outside of the internal combustion engine;
an air cooling chamber for cooling the ambient air received from the air intake duct to generate cooled air, wherein the air cooling chamber is powered by a standalone cooling device, and the standalone cooling device comprises: a control unit, a compressor, a condenser, and a receiver dryer; and
an air output duct for providing the cooled air generated from the air cooling chamber to the internal combustion engine,
wherein, the air cooling chamber assembly is connected to an air intake of the internal combustion engine to cool the ambient air to generate the cooled air prior to entering the internal combustion engine, and to provide the cooled air generated to the air intake of the internal combustion engine.

9. The internal combustion engine of claim 8, wherein the standalone cooling device comprises:
the control unit powered by a first power connector and a second power connector of a battery, wherein the control unit controls the operation of the standalone cooling device, and the control unit turns on the standalone cooling device when the control unit detects from an ignition circuit of the internal combustion engine that an ignition of the internal combustion engine is on;
the compressor for compressing gaseous refrigerant of the standalone cooling device, wherein the compressor comprises a low pressure line connector connecting a low pressure line, a high pressure line connector connecting a high pressure line, a first power line connecting to a first power output line of the control unit, and a second power line connecting to a second power output line of the control unit;
the condenser, wherein the condenser comprises an array of fins and a gaseous refrigerant tube for cooling liquefy refrigerant using a DC fan after each compression cycle, wherein the DC fan is powered and controlled by a third power output line and a fourth power output line of the control unit, and
the receiver dryer, wherein the receiver dryer stores the liquefy refrigerant from the condenser and delivers the liquefy refrigerant to an expansion valve for lowering the pressure of the liquefy refrigerant to allow it to change from a liquid to gaseous,
wherein the first end of the expansion valve is connected to the first end of the gaseous refrigerant tube, and the second end of the expansion valve is connected to the high pressure line.

10. The internal combustion engine of claim 9, wherein the air intake duct comprises:
a first end, wherein the first end receives the ambient air, and
an opposite, second end, wherein the second end provides the ambient air to the air cooling chamber, and
the air output duct comprises:
a first end, wherein the first end receives the cooled air from the air cooling chamber, and an opposite, second end, wherein the second end provides the cooled air received to the air intake of the internal combustion engine.

11. The internal combustion engine of claim 10, wherein the air output duct is shielded by one or more thermal shield materials to maintain low temperature of the cooled air in an engine compartment of the internal combustion engine.

12. The internal combustion engine of claim 11, wherein the air cooling chamber comprises an evaporator, wherein the evaporator comprises:
an array of fins and a gaseous refrigerant tube having a first end and a second end,
wherein the first end of the gaseous refrigerant tube is connected to a low pressure line of a cooling device to receive a gaseous refrigerant, and the second end of the gaseous refrigerant tube is connected to an input of a compressor of the cooling device, and the evaporator cools the ambient air passing through the air cooling chamber to generate the cooled air.

13. The internal combustion engine of claim 8, wherein air density of the cooled air from the air cooling chamber is increased due to a cooling process inside the air cooling chamber assembly.

14. The internal combustion engine of claim 8, wherein high density cooled air from the air cooling chamber comprises increased amount of oxygen molecules, and the increased amount of oxygen molecules in the high density cooled air improves the fuel efficiency and reduces greenhouse gas emission of the internal combustion engine.

15. An internal combustion engine, comprising:
an air cooling chamber assembly powered by a standalone cooling device, wherein the air cooling chamber assembly comprises:
an air intake duct for receiving ambient air outside of the internal combustion engine;
an air cooling chamber for cooling the ambient air received from the air intake duct to generate cooled air, wherein the standalone cooling device comprises: a control unit, a compressor, a condenser, and a receiver dryer; and
an air output duct for providing the cooled air from the air cooling chamber to the internal combustion engine,
wherein, the air cooling chamber assembly is connected to an air intake of the internal combustion engine to cool the ambient air to generate the cooled air prior to entering the internal combustion engine, and to provide the cooled air generated to the air intake of the internal combustion engine.

16. The internal combustion engine of claim 15, wherein the air intake duct comprises:
a first end, wherein the first end receives the ambient air; and
an opposite, second end, wherein the second end provides the ambient air to the air cooling chamber;
wherein the air output duct comprises:
a first end, wherein the first end receives the cooled air from the air cooling chamber, and
an opposite, second end, wherein the second end provides the cooled air received to the air intake of the internal combustion engine; and
wherein the air output duct is shielded by one or more thermal shield materials to maintain low temperature of the cooled air in an engine compartment of the internal combustion engine.

17. The internal combustion engine of claim 16, wherein the air cooling chamber comprises an evaporator, wherein the evaporator comprises:
an array of fins and a gaseous refrigerant tube having a first end and a second end,
wherein the first end of the gaseous refrigerant tube is connected to a first end of an expansion valve and a second end of the expansion valve is connected to a high pressure line of the standalone cooling device of the automobile to receive a gaseous refrigerant, and the second end of the gaseous refrigerant tube is connected to a low pressure line and further connected to an input of a compressor of the standalone cooling device of the automobile, and the evaporator of the air cooling chamber cools the ambient air passing through the air cooling chamber to generate the cooled air.

18. The internal combustion engine of claim 17, wherein the standalone cooling device comprises:
the control unit powered by a first power connector and a second power connector of a battery, wherein the control unit controls the operation of the standalone cooling device, and the control unit turns on the standalone cooling device when the control unit detects from an ignition circuit of the internal combustion engine that an ignition of the internal combustion engine is on;
the compressor for compressing gaseous refrigerant of the standalone cooling device, wherein the compressor comprises a low pressure line connector connecting a low pressure line, a high pressure line connector connecting a high pressure line, a first power line connecting to a first power output line of the control unit, and a second power line connecting to a second power output line of the control unit;
the condenser, wherein the condenser comprises an array of fins and a gaseous refrigerant tube for cooling liquefy refrigerant using a DC fan after each compression cycle, wherein the DC fan is powered and controlled by a third power output line and a fourth power output line of the control unit, and
the receiver dryer, wherein the receiver dryer stores the liquefy refrigerant from the condenser and delivers the liquefy refrigerant to an expansion valve for lowering the pressure of the liquefy refrigerant to allow it to change from a liquid to gaseous,
wherein the first end of the expansion valve is connected to the first end of the gaseous refrigerant tube, and the second end of the expansion valve is connected to the high pressure line.

19. The internal combustion engine of claim 15, wherein air density of the cooled air from the air cooling chamber is increased due to a cooling process inside the air cooling chamber assembly.

20. The internal combustion engine of claim 15, wherein high density cooled air from the air cooling chamber comprises increased amount of oxygen molecules, and the increased amount of oxygen molecules in the high density cooled air improves the efficiency of the internal combustion engine.

* * * * *